(12) United States Patent
Lee

(10) Patent No.: US 9,469,206 B1
(45) Date of Patent: Oct. 18, 2016

(54) CHARGING GUN FOR ELECTRIC VEHICLE

(71) Applicant: HON HAI PRECISION INDUSTRY CO., LTD., New Taipei (TW)

(72) Inventor: Chia-Yen Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/930,822

(22) Filed: Nov. 3, 2015

(51) Int. Cl.
*H01R 13/635* (2006.01)
*B60L 11/18* (2006.01)
*H01R 13/627* (2006.01)
*H01R 13/533* (2006.01)

(52) U.S. Cl.
CPC ....... *B60L 11/1818* (2013.01); *H01R 13/6271* (2013.01); *H01R 13/533* (2013.01); *H01R 2201/26* (2013.01)

(58) Field of Classification Search
USPC ..................... 439/34, 35, 382–385
See application file for complete search history.

(56) References Cited

U.S. PATENT DOCUMENTS

| | | | | |
|---|---|---|---|---|
| 3,087,982 A | * | 4/1963 | Hayes | H01J 5/12 165/185 |
| 8,342,856 B2 | * | 1/2013 | Takada | H01R 13/521 439/246 |

\* cited by examiner

*Primary Examiner* — Tho D Ta
(74) *Attorney, Agent, or Firm* — Zhigang Ma

(57) ABSTRACT

A charging gun for charging a charging seat includes a connecting line configured to deliver an electric charge from an electric source, a charging head located at one end of the connecting line, and a number of first pins. The number of first pins is surrounded by a first peripheral wall. The first peripheral wall includes at least one first protrusion protruded from an outer surface thereof. The number of first pins connects to a corresponding number of second pins of the charging seat. The charging seat includes a second peripheral wall surrounding the number of second pins. The diameter of an inner surface of the second peripheral wall is greater than the diameter of the outer surface of the first peripheral wall.

9 Claims, 4 Drawing Sheets

CHARGING GUN FOR ELECTRIC VEHICLE

FIELD

The subject matter herein generally relates to charging guns, and more particularly to a charging gun for an electric vehicle.

BACKGROUND

Generally, a charging gun for charging a charging seat of an electric vehicle is inserted manually into the charging seat. The size of a contact area between the charging gun and the charging seat may determine an amount of force required to insert and remove the charging gun from the charging seat.

BRIEF DESCRIPTION OF THE DRAWINGS

Implementations of the present technology will now be described, by way of example only, with reference to the attached figures.

DETAILED DESCRIPTION

Figure 1:
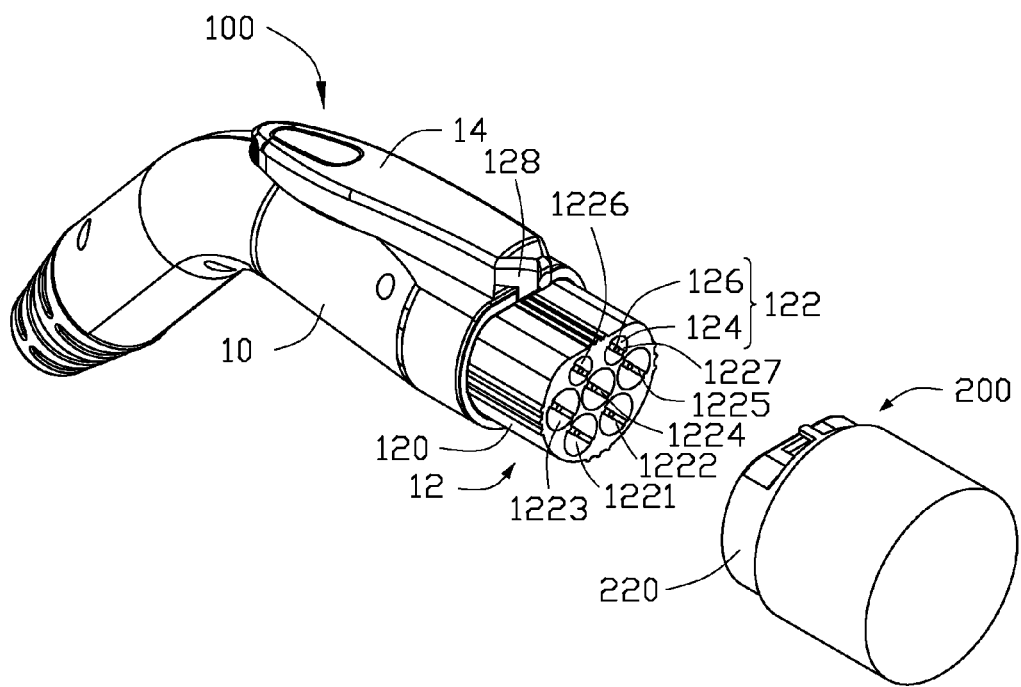
FIG. 1 is an isometric view of a charging gun and a charging seat.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 illustrates an embodiment of a charging gun 100 for charging a charging seat 200. The charging gun 100 can receive electric charge from a power source (not shown). The charging seat 200 can be fixedly or removably installed on an electric vehicle (not shown). The electric vehicle can be an electric scooter, an electric bike, or the like. The charging seat 200 can be electrically coupled to the electric vehicle to provide power to the electric vehicle.

The charging gun 100 can include a connecting line 10 and a charging head 12. The charging head 12 can be located at one end of the connecting line 10. The connecting line 10 can connect to the power source to transmit the electric charge to the charging head 12.

The charging head 12 can include a first peripheral wall 120 and a plurality of first pins 122. The plurality of first pins 122 can be located in a space surrounded by the first peripheral wall 120.

Figure 2:
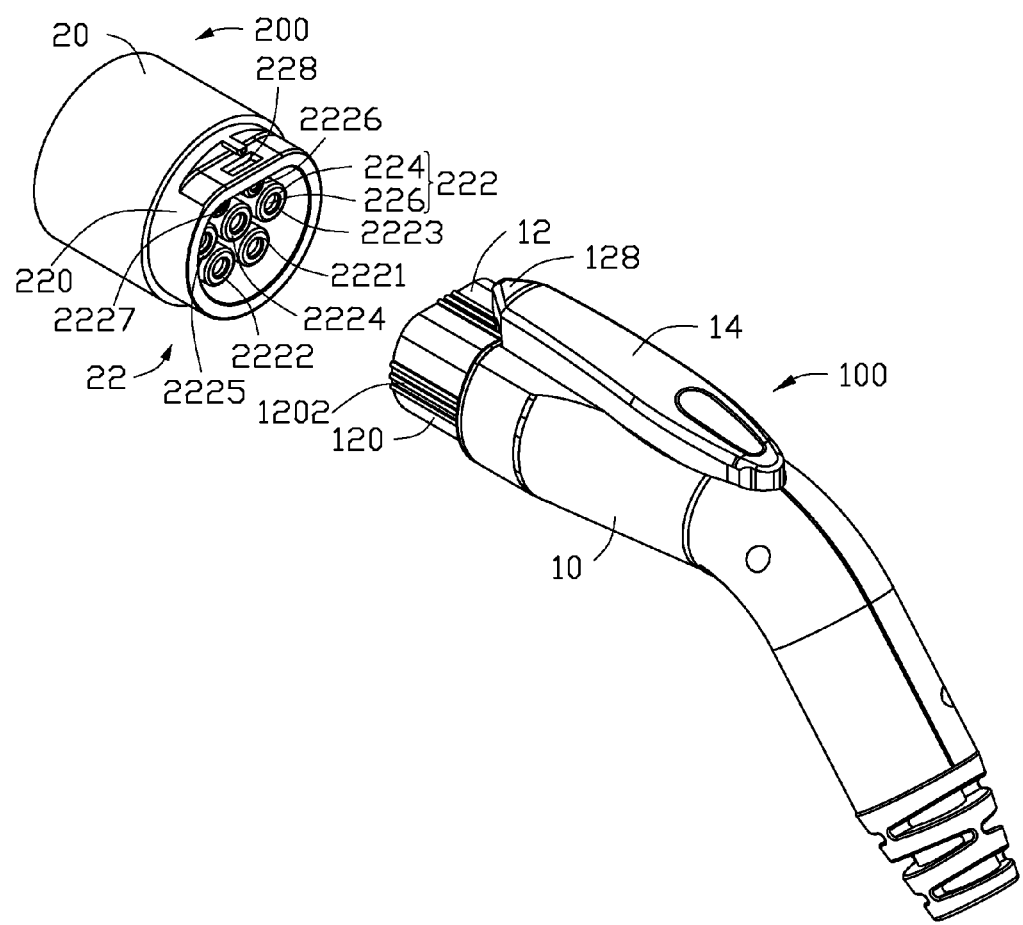
FIG. 2 is an isometric view similar to FIG. 1, but viewed from a different angle.

As illustrated in FIG. 2, the plurality of first pins 122 can connect to a corresponding plurality of second pins 222 of the charging seat 200.

Referring again to FIG. 1, the plurality of first pins 122 can include a first positive supply voltage pin 1221, a first negative supply voltage pin 1222, a first charging connection confirmation pin 1223, a first charging messaging pin 1224, a first positive supply auxiliary voltage pin 1225, a first negative supply auxiliary voltage pin 1226, and a first ground pin 1227. The first positive supply voltage pin 1221 and the first negative supply voltage pin 1222 can supply a charging voltage to the charging seat 200. The first charging connection confirmation pin 1223 can generate a confirmation signal when the plurality of first pins 122 connects to the plurality of second pins 222 successfully. The first charging messaging pin 1224 can communicate with the charging seat 200 during a process of charging the charging seat 200 to control charging of the charging seat 200. The first positive supply auxiliary voltage pin 1225 and the first negative supply auxiliary voltage pin 1226 can supply an auxiliary voltage during a process of charging the charging seat 200. The first ground pin 1227 can be electrically couple to ground.

In at least one embodiment, the plurality of first pins 122 can be female pins, and the plurality of second pins 222 can be male pins. Each first pin 122 can define an inserting cavity 124 therein and include a connection needle 126 therein. Each second pin 222 can include a shaft portion 224. An inserting hole 226 can be defined in one end of the shaft portion 224. In another embodiment, the plurality of first pins 122 can be male pins, and the plurality of second pins 222 can be female pins.

The charging gun 100 can include a handle 14 extending from the charging head 12 toward the connecting line 10. The handle 14 can include a hook 128 located at one end portion of the handle 14.

The charging seat 200 can include a seat body 20. The seat body 20 can fixedly or removably install the charging seat 200 to the electric vehicle. One end portion of the seat body 20 can include a connecting portion 22. The connecting portion 22 can include a second peripheral wall 220. The plurality of second pins 222 can be located in space surrounded by the second peripheral wall 220. The plurality of second pins 222 can include a second positive supply voltage pin 2221, a second negative supply voltage pin 2222, a second charging connection confirmation pin 2223, a second charging messaging pin 2224, a second positive supply auxiliary voltage pin 2225, a second negative supply auxiliary voltage pin 2226, and a second ground pin 2227. The second positive supply voltage pin 2221 and the second negative supply voltage pin 2222 can receive the charging voltage from the first positive supply voltage pin 1221 and the first negative supply voltage pin 1222, respectively. The second charging connection confirmation pin 2223 can generate a confirmation signal when the plurality of first pins 122 connects to the plurality of second pins 222 successfully. The second charging messaging pin 2224 can communicate with the charging gun 100 during a process of charging the charging seat 200 to control charging of the charging seat 200. The second positive supply auxiliary voltage pin 2225 and the second negative supply auxiliary voltage pin 2226 can receive the auxiliary voltage from the first positive supply auxiliary voltage pin 1225 and the first negative supply voltage pin 1226, respectively. The second ground pin 2227 can be electrically coupled to ground.

Figure 3:
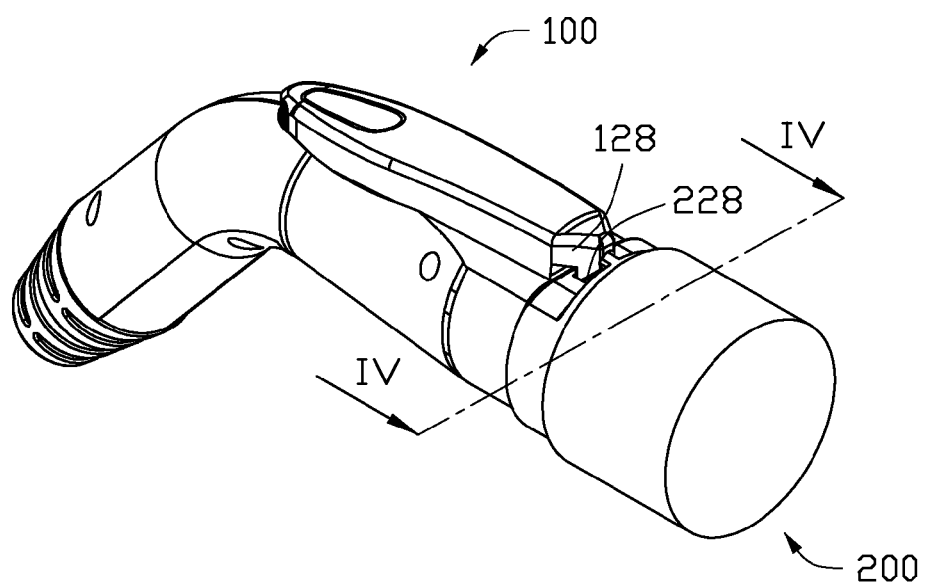
FIG. 3 is an isometric view of the charging gun inserted into the charging seat.

As illustrated in FIG. 3, a latching groove 228 can be defined in the connecting portion 22. When the plurality of first pins 122 is connected to the plurality of second pins 222, the latching hook 128 can be latched in the latching groove 228.

Figure 4:
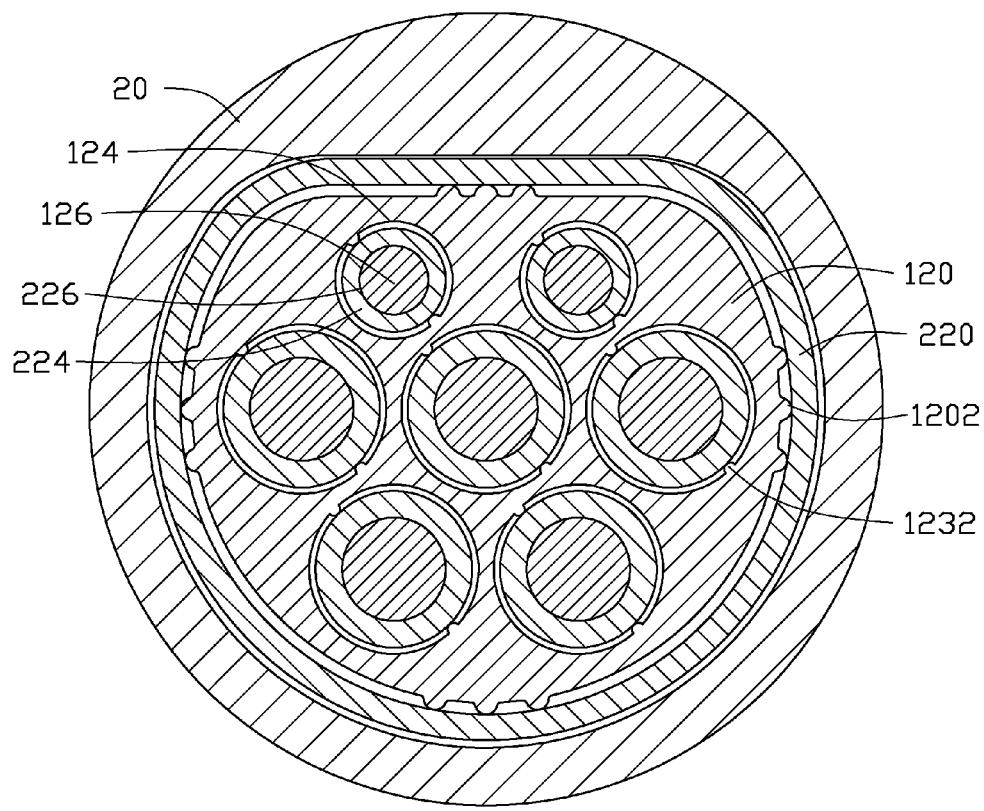
FIG. 4 is a cross-sectional view of FIG. 3 taken along line IV-IV.

As illustrated in FIG. 4, an outer diameter of the first peripheral wall 120 is less than an inner diameter of the second peripheral wall 220. An outer surface of the first peripheral wall 120 can include at least one first protrusion 1202. A height of the at least one first protrusion 1202 relative to the outer surface of the first peripheral wall 120 can be equal to a difference between the radius of an inner surface of the second peripheral wall 220 and the radius of the outer surface of the first peripheral wall 120.

In at least one embodiment, the at least one first protrusion 1202 can be an elongated protrusion extended along an inserting direction of the charging gun 100. In another embodiment, the at least one first protrusion 1202 can be a plurality of protrusions arranged along the inserting direction of the charging gun 100. In another embodiment, the at least one protrusion 1202 can protrude from the inner surface of the second peripheral wall 220.

In at least one embodiment, an inner circumference of the plurality of first pins 122 is greater than an outer circumference of the plurality of second pins 222, and an inner surface of each of the plurality of first pins 122 can include at least one second protrusion 1232. In at least one embodiment, the second protrusion 1232 can be an elongated protrusion extended along a length of the first pin 122. In another embodiment, the second protrusion 1232 can be a plurality of protrusions arranged along the length of the first pin 122. A height of the second protrusion 1232 relative to the inner surface of the first pin 122 can be equal to a difference between the radius of the inner surface of the first pin 122 and the radius of an outer surface of the second pin 222. In another embodiment, an inner circumference of the plurality of second pins 222 is greater than an outer circumference of the plurality of first pins 122, and the at least one second protrusion 1232 protrudes from the outer surface of the plurality of first pins 122.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A charging gun for charging a charging seat, the charging gun comprising:
    a connecting line configured to deliver an electric charge from an electric source;
    a charging head located at one end of the connecting line and comprising a first peripheral wall having an outer surface and at least one first protrusion extending from the outer surface, the first peripheral wall surrounding a space; and
    a plurality of first pins located in the space surrounded by the first peripheral wall and configured to connect to a plurality of second pins of the charging seat, whereby energy can be transferred to the charging seat;
    wherein a diameter of the outer surface of the first peripheral wall is less than a diameter of an inner surface of a second peripheral wall surrounding the plurality of second pins; and
    wherein a height of the at least one first protrusion relative to the outer surface of the first peripheral wall is equal to a difference between a radius of the inner surface of the second peripheral wall and a radius of the outer surface of the first peripheral wall.

2. The charging gun as in claim 1, wherein:
    the plurality of first pins comprises a first positive supply voltage pin and a first negative supply voltage pin;
    the first positive supply voltage pin and the first negative supply voltage pin are configured to connect to a second positive supply voltage pin and a second negative supply voltage pin, respectively, of the charging seat; and
    the first positive supply voltage pin and the first negative supply voltage pin are configured to supply a charging voltage during a process of charging the charging seat.

3. The charging gun as in claim 2, wherein:
    the plurality of first pins comprises a first charging connection confirmation pin and a first charging messaging pin;
    the first charging connection confirmation pin and the first charging messaging pin are configured to connect to a second charging connection confirmation pin and a second charging messaging pin, respectively, of the charging seat;
    the first charging connection confirmation pin is configured to generate a confirmation signal when the plurality of first pins connects to the plurality of second pins successfully; and
    the first charging messaging pin is configured to communicate with the charging seat during a process of charging the charging seat to control charging of the charging seat.

4. The charging gun as in claim 3, wherein:
    the plurality of first pins comprises a first positive supply auxiliary voltage pin and a first negative supply auxiliary voltage pin;
    the first positive supply auxiliary voltage pin and the first negative supply auxiliary voltage pin are configured to connect to a second positive supply auxiliary voltage pin and a second negative supply auxiliary voltage pin, respectively, of the charging seat; and
    the first positive supply auxiliary voltage pin and the first negative supply auxiliary voltage pin are configured to supply an auxiliary voltage during a process of charging the charging seat.

5. The charging gun as in claim 4, wherein:
    the plurality of first pins comprises a first ground pin configured to electrically couple to ground; and
    the first ground pin is configured to connect to a second ground pin of the charging seat.

6. The charging gun as in claim 5, wherein:
    the charging gun comprises a handle extending from the charging head;
    a hook is located at one end portion of the handle;
    the charging seat comprises a seat body configured to install the charging seat to an electric vehicle;
    one end portion of the seat body comprises a connecting portion;
    the connecting portion comprises the second peripheral wall;

a latching groove is defined in the connecting portion; and the latching hook is latched in the latching groove when the plurality of first pins is connected to the plurality of second pins.

7. The charging gun as in claim 6, wherein:

a diameter of an inner surface of each of the plurality of first pins is greater than a diameter of an outer surface of each of the plurality of second pins;

each of the plurality of first pins comprises at least one second protrusion protruded from the inner surface; and a height of the second protrusion relative to the inner surface of the first pin is equal to a difference between the radius of the inner surface of the first pin and the radius of the outer surface of the second pin.

8. The charging gun as in claim 7, wherein:

an inserting cavity is defined in each of the plurality of first pins;

a connection needle is located inside of the inserting cavity;

each second pin includes a shaft portion; and an inserting hole is defined in one end of the shaft portion.

9. The charging gun as in claim 7, wherein:

a diameter of an inner surface of each of the plurality of second pins is greater than a diameter of an outer surface of each of the plurality of first pins;

each of the plurality of first pins comprises at least one second protrusion protruded from the outer surface; and a height of the second protrusion relative to the outer surface of the first pin is equal to a difference between the radius of the inner surface of the second pin and the radius of the outer surface of the first pin.

\* \* \* \* \*